A. E. MYERS.
NUT LOCK.
APPLICATION FILED JUNE 16, 1914.

1,139,897.
Patented May 18, 1915.

WITNESSES:

INVENTOR—
A. E. Myers
BY
ATTORNEY.

UNITED STATES PATENT OFFICE.

ALBERT ELLSWORTH MYERS, OF WEST ALEXANDER, PENNSYLVANIA.

NUT-LOCK.

1,139,897.  Specification of Letters Patent.  Patented May 18, 1915.

Application filed June 16, 1914. Serial No. 845,383.

*To all whom it may concern:*

Be it known that I, ALBERT E. MYERS, a citizen of the United States of America, and resident of West Alexander, county of Washington, and State of Pennsylvania, have invented certain new and useful Improvements in Nut-Locks, of which the following is a specification.

This invention relates to improvements in nut locks, and it has for its object to provide a simple and efficient device whereby retraction of nuts on their bolts is prevented.

In describing the invention in detail, reference is herein had to the accompanying drawing, forming a part of this specification, in which—

Figure 1:
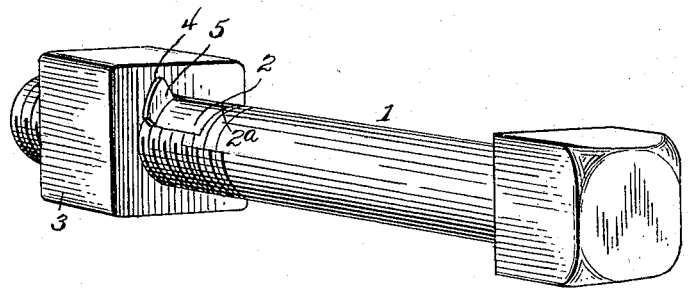
Figure 2:
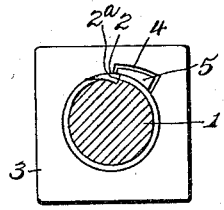
Figure 3:
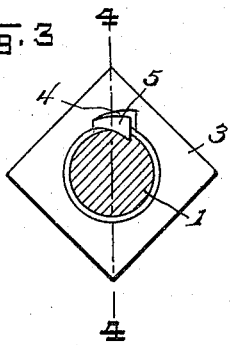
Figure 4:
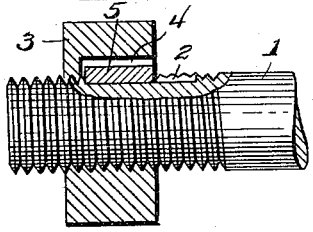
Figure 5:

Figure 1 is a perspective view of the invention applied; Fig. 2 is an inner face view of the nut, with the bolt shown in cross section and in forward rotating position; Fig. 3 is a similar view showing the nut in a position wherein it is locked against rearward rotation; Fig. 4 is a partial section on the line 4—4, Fig. 3; and Fig. 5 is a perspective view of the locking key.

Referring to said drawings, in which like designating characters distinguish like parts throughout the several views—1 indicates a bolt in the threaded end of which is provided a substantially triangular thread-intersecting recess 2 the rear wall or shoulder $2^a$ of which forms a right angle, or an angle less than a right angle, with the threads, as is clearly shown in Figs. 2 and 3, and the bottom of which is gradually and regularly inclined or curved forward and outward to the outer edges of the threads.

The nut 3 has extending thereinto from its inner face a cavity 4 which is in open communication on its inner side with the threaded bore of the nut, said cavity corresponding in form with and being adapted for receiving therein a plain unthreaded key 5 which is of substantially rectangular form when viewed from its sides and edges, but which is of materially less thickness at its front edge than at its rear edge, its inner and outer faces presenting arcuate curvatures wherein the arcs are struck from different centers. The concave curvature of said inner face corresponds substantially to the curvature of the bore and, consequently, to the curvature of the bolt. The cavity 4 is of a size and form which readily accommodates therein the said key 5, so that forward rotation of the nut over the threads of the bolt is not hindered, said key being carried thin edge foremost, by the nut and freely riding over said threads, as shown in Fig. 2. The greatest depth of the recess 2 in the bolt is less than the thickness of the rear edge of the key, and as a consequence it is not possible for said key to so seat in said recess 2 as to permit the nut to ride thereover. The bolt having been preliminarily disposed in a position wherein the said recess 2 occupies a topmost position, retraction of the nut may only be accomplished to the point where the key will gravitate into said recess, as shown in Fig. 3. In this position, the rear, or thicker, edge of the key seats against the shoulder $2^a$ while the front edge thereof remains elevated so that it is engaged by the forward wall of the cavity 4 in the nut, as shown in Fig. 3.

What is claimed is—

The combination with a threaded bolt having a thread-intersecting recess formed therein, one wall of said recess being substantially radial and the other wall being gradually inclined forward therefrom to the outer edges of the threads of a nut having a substantially rectangular cavity formed in its inner face and in open communication throughout its length with its bore, said cavity being of greater depth at its rear edge than at its front edge, and a substantially rectangular gravity-actuated key loosely mounted in said cavity, said key having a greater thickness at its rear edge than at its front edge and also a greater thickness than the depth of the recess in the bolt, said key having its inner face arcuately curved and in contact throughout its length with the bolt, said key being adapted when said recess in the nut is moved into a position registering with the recess in the bolt to have its rear edge drop into the latter while its front edge remains in a substantially unchanged position.

In testimony whereof, I affix my signature in presence of two subscribing witnesses.

ALBERT ELLSWORTH MYERS.

Witnesses:
A. W. RADER,
WM. F. MYERS.

Copies of this patent may be obtained for five cents each, by addressing the "Commissioner of Patents, Washington, D. C."